Nov. 21, 1939.   A. H. FRAZIER   2,180,354
WATER SURVEYING APPARATUS
Filed Sept. 18, 1937   2 Sheets-Sheet 2
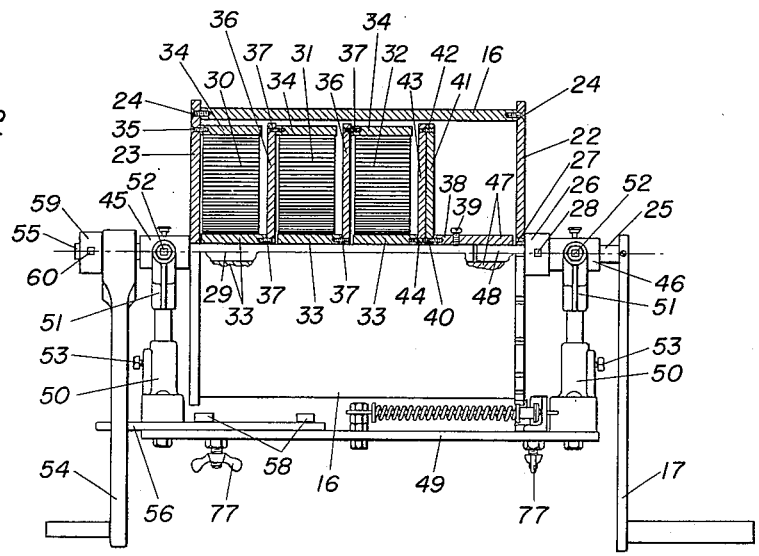
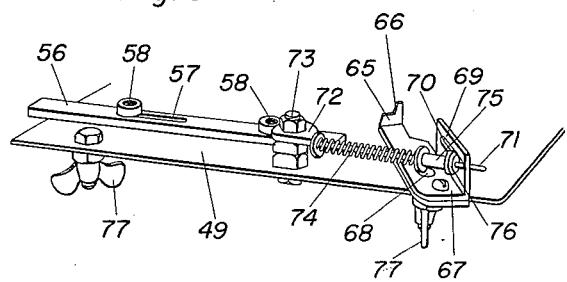
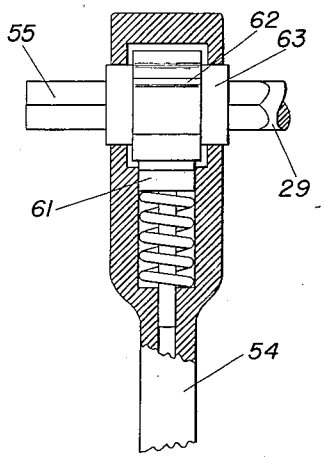
INVENTOR
Arthur H. Frazier
BY
ATTORNEY Patented Nov. 21, 1939

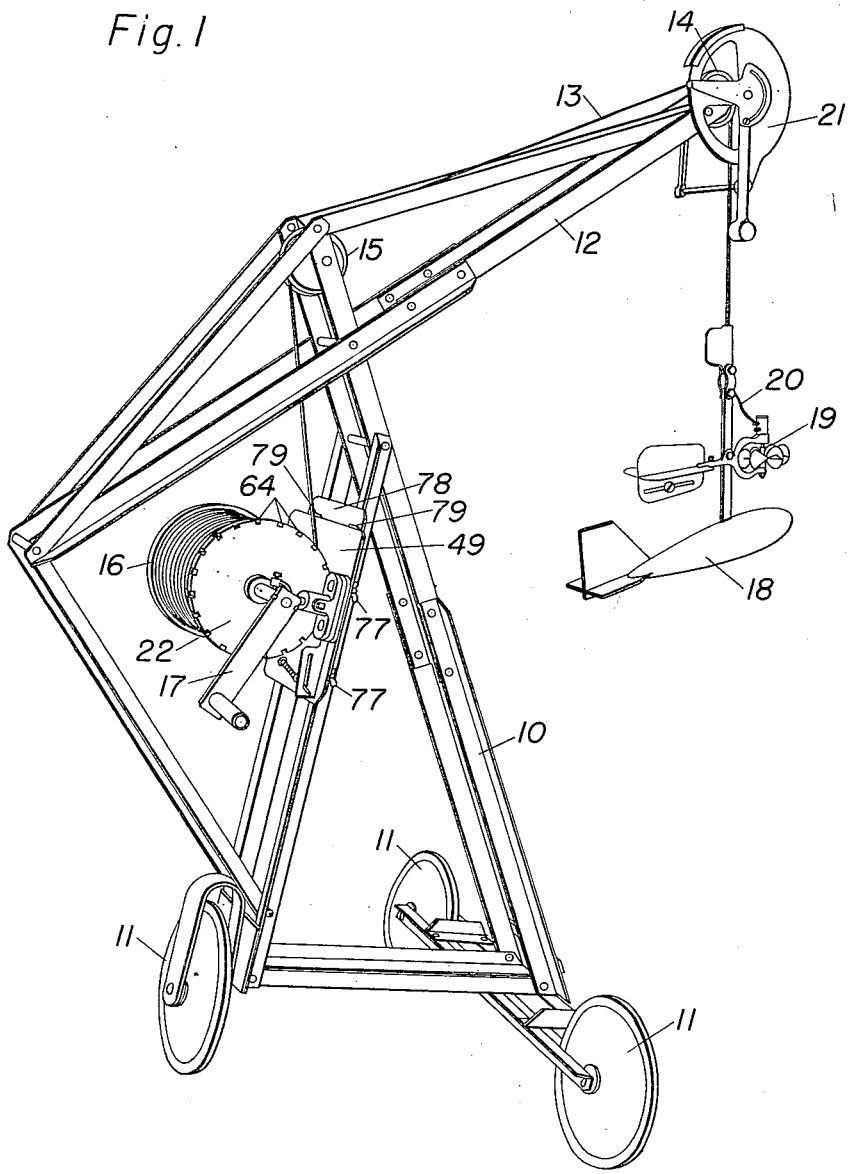

2,180,354

UNITED STATES PATENT OFFICE 2,180,354

WATER SURVEYING APPARATUS

Arthur H. Frazier, Washington, D. C., assignor to the Government of the United States, as represented by the Secretary of the Interior Application September 18, 1937, Serial No. 164,538

3 Claims. (Cl. 73—122)

(Granted under the act of March 3, 1883, as amended April 30, 1928; 370 O. G. 757)

This invention relates to water surveying and aims generally to improve the same.

In such water survey work it is necessary to raise and lower instruments such as sounding weights, current meters, and the like, as in measuring velocities and depths of rivers in connection with measurements of discharge, for example.

In such work it is frequently essential to be able to raise the instruments promptly to prevent damage or loss thereof in drift ice or floating debris, such as is usually encountered at flood stage. Moreover, the sounding weights used frequently reach a weight of 150 lbs. or more and have to be handled through vertical distances up to 150 feet or more, and it is often necessary to make numerous readings within a short interval of time.

With the ordinary hand cranked reels used heretofore to raise and lower the instruments, great exertion has been required of the surveyor, and it has been impossible to attain sufficient speed in the reeling up of the devices to avoid frequent loss and damage of instruments.

In addition constant effort has been required to hold back the reel during lowering of the instruments, to prevent running away thereof. Moreover, while exerting this restraining effort it has been difficult for the operator to detect when bottom has been reached. As is well known, exact determination of bottom-level is of utmost importance in water surveying as this is the indication of water depth which must be determined accurately to obtain any assurance of correctness in measurement of discharge.

A particular object of the present invention is to increase the speed with which the instruments can be raised.

Another object is to greatly reduce the effort required of the surveyor in making such water surveys and the like.

A third object is to make provisions which will enable the operator to more acurately detect the reaching of bottom by the instrument.

These and other objects and advantages of the invention will clearly appear from the following detailed description of prefered form of means illustrative of the principles thereof.

In accordance with the principles of this invention there is to be employed a power storing means, preferably of the spring type, capable of storing power as a reel is turned in unwinding the cable and lowering the instruments. Unlike the practice with a usual spring-reel of a fishing pole, however, the spring and reel devices employed in accordance with this invention, are not initially loaded so as to completely retrieve the instruments. To the contrary, the reel in accordance with this invention, is to be entirely unloaded, or but lightly initially loaded, when the cable is completely wound thereon. Thus, when not otherwise retained, the unsustained weight on the cable will unwind cable from the reel, and the reel will of itself lower in stages the sounding weight or other instruments attached to the cable, until a point of equilibrium is reached either at an intermediate stage, or at bottom-contact stage, at which the tension imparted to the spring during the lowering of the instruments just balances the pull of the cable at the reel-drum.

The invention further contemplates the adjusting of the light initial loading of the spring-reel means in accordance with the weight of the instruments and the approximate depth of the survey to be made, to place the said point of equilibrium at some distance above the bottom expected to be reached by the survey.

These features are of great assistance in facilitating detection of grounding of the instruments, and also in enabling rapid retrieving of the same, and in minimizing the work required of the operator, as will appear more fully in the following description of a preferred mechanism embodying the means and operable by the principles of the invention.

In the accompanying drawings of this illustrative embodiment:

Figure 1 is a perspective assembly view of such mechanism or rig;

Figure 2 is an elevation partly in section of the reeling mechanism thereof;

Figure 3 is a perspective of part of the base of the reeling mechanism; and

Figure 4 is a detail, partly in section, of the ratchet of the initial tension crank.

Referring to Figure 1 of the drawings, the illustrative embodiment therein disclosed comprises a framework 10, preferably of crane-form, as shown, and mounted on wheels 11, to facilitate transportation from place to place. The framework 10 comprises an arm 12 adapted to project over the rail of a bridge or from whatever other place is used as a base of operations. On the framework 10 is carried means for guiding the instrument raising and lowering cable 13, herein in the form of sheave or pulley 14 carried at the end of arm 12 and second sheave or pulley 15, between the pulley 14 and the point of reel-mounting, over which the cable 13 may be freely trained.

The framework 10, in the form shown, also carries the reeling means comprising the drum 16, and more fully described hereinafter. In the form shown in Figure 1, this reeling means is arranged for a right-handed operator, to pay out the cable 13 by a counter clockwise movement of its crank 17 and to reel up the cable by a clockwise movement thereof, to obtain maximum speed in the reeling up of the cable by such operator.

As illustrative of instruments which may be associated with the cable 13, there are shown, attached to its end, a sounding weight 18 of conventional form and a conventional velocity meter 19, such as the type A current meter commonly employed by the United States Geological Survey, which in the form shown is provided with an insulated lead-wire 20 embodied in the cable 13 and leading to an insulated brush-ring (not shown) carried by the end-plate or rim of the drum 16 and contacted by brush means in the usual manner.

Further or other instruments may, of course, be associated with the cable, as illustrated by the inclinometer generally shown at 21, the function of which is to indicate the angle of departure of the cable 13 from the vertical.

Referring to Figure 2, the illustrative form of reel and spring means therein set forth, comprises, as above noted, the drum 16, secured to drum ends 22 and 23, as by machine screws 24. The drum end 22 is rigidly secured to crank shaft 25 of crank 17 by any suitable means, such as collar 26 secured to drum end 22 by machine screws 27 and to shaft 25 by set screw 28. The companion drum end 23 is rotatable about the power-storer shaft 29, in the form shown. The drum 16 is connected to a power-storing means of any suitable form either separate from or embodied in the drum assembly, herein shown as made up of a series of springs, as the three springs 30, 31 and 32, tensioned between the drum 16 and the spring-tensioning shaft 29.

In the form shown the springs 30, 31 and 32 are of the spiral form, tension between sleeve members 33 and outer or rim-members 34, and the connection of the drum 16 to the power-storing means is made by way of the drum-end 23 secured to the rim 34 of the spring unit 30 as by means of machine screws 35.

The series connections of the spring units 30, 31 and 32 in the form shown are effected by way of the spacer-plates 36, secured respectively to the sleeves 33 and rims 34 of adjacent units, as by machine screws 37.

The last spring, 32, of the series illustrated is connected to the spring-tensioning shaft 29, by suitable means, such as the collar 38 secured to the shaft 29 by set screw 39, and having secured to it by machine-screws 40 a plate 41, bound by machine screws 42 to guide-plate 43 which in turn is connected to the sleeve 33 of spring unit 32, by machine screws 44.

Upon assembly of the power-storing means 30—44 to the drum end 23 and securing of this structure on spring-tensioning shaft 29 carrying bearing 45, as shown in Figure 2; and upon further assembly of drum-end 22 to collar 26 mounted on crank shaft 25, which is provided with bearing member 46; the entire loaded drum assembly may be completed by means of drum 16 and machine screws 24.

In the form illustrated a supporting bearing is suitably provided for the end of the assembly carried by shaft 29, as by the journalling of extension 47 of collar 38 on extension 48 of crankshaft 25.

To mount the assembly thus formed, a base 49 is provided, which in the form shown, carries bearing posts 50 having forked heads 51 provided with set screws 52 for clamping the bearings 45 and 46, the heads 51 being adjustable in the posts 50 by means of set screws 53.

Suitable means is also provided for applying and adjusting the initial tension of the power-storing means, herein by means of crank member 54 engaged with squared end 55 of the tensioning shaft 29, and means is provided for maintaining the adjusted initial tension, in the form shown by detent 56 (see Figure 3), slotted at 57 to slide on the shanks of headed guides 58 carried by base 49, so that it may be moved into or out of engagement with crank 54.

Again referring to Figure 2, means is provided for retaining crank 54 on the squared end 55 of shaft 29, shown as a collar 59 provided with a set screw 60.

For the purpose of preventing reverse loading of the springs, in the event of breaking of the cable 13 and spinning of the drum by unloading of the springs with such inertia that it might overrun its point of no loading, a ratchet connection is embodied between the tensioning crank 54 and the tensioning shaft 29. This may be of any desired form that shown (see Fig. 4) comprising a spring pressed detent 61 engaging blocking faces of lugs 62 of element 63 in the direction of normal tensioning of the mechanism, and riding over inclined faces of such lugs 62 in the opposite direction, i. e., that taken if the spring-loaded reel (Fig. 2) should run away after breaking of cable 13.

Further means are provided for locking the reel in any given position. This locking means, in the form shown, is provided by notching the edge of the drum-end 22, as at 64 (Figure 1) to enable engagement therewith of a member of suitable form to lock the reel against movement in either direction, depending upon whether the cable is unreeled to less than or beyond the equilibrium point mentioned above and hereinafter.

A simple form of locking means which has been found advantageous is shown (see Figure 3) and comprises a detent having an engaging portion 65 adapted to enter apertures in the reel, as the notches 64 in the drum-end 22, and a stop portion, as the portion 66 adapted to abut against the drum end 22 when the portion 65 is engaged in the notch 64, to keep the portion 65 from slipping entirely through the notch 64.

This detent 65—66 in the form shown is carried by a plate 67, pivoted at 68 to the base 49 so that the detent 65—66 may be swung into and out of engagement with the notches 64. Means is provided to hold the detent 65—66 in or out of such engagement, as by providing the detent-plate 67 with toggle means, herein comprising the upstanding flange 69 formed with a longitudinal slot 70 extending beyond the pivot in both directions, through which the finger-engageable end 71 of toggle-lever 72 projects; the lever 72 being pivoted to the base at 73 and provided with a spring 74 pressing a rider 75 toward the end 71 of the lever.

With this construction flipping of the toggle lever 71 to the position shown in Figure 3 advances the detent 65 for engagement with one of the notches 64 to lock the reel, while movement of the lever end 71 to the other end of slot

70 releases the reel and holds the detent 65 in non-engaging position.

Means is provided for securing the reel to the frame 10 (Figure 1) herein by wing nuts 77 to secure the reel-base 49 to a plate 78 which is fastened to the frame members as by bolts 79 to provide for mounting of the reel thereon.

Suitable means is also provided for enabling accurate determination of the length of cable 13 unreeled. This means may take the form of a revolution counter (not shown) calibrated, if desired, to read in terms of feet and tenths of a foot of cable unreeled, and associated with the crank shaft 25.

In this connection it is preferable to size the drum 16 so that the circumference measured at the center-line of the cable 13 wound upon it, will be a known amount, preferably an even number of feet, for example, two feet. By then spacing the notches 64 so that they will divide the said circumference into tenths of a foot, as by having twenty evenly spaced notches in the example given, the locking means 64—65 will be correlated with the revolution counter to enable locking of the reel at one-tenth-foot intervals, in accordance with the general requirements of water-survey work.

To illustrate the mode of operating the novel rig of this invention in accordance with one preferred aspect thereof, it may be assumed as illustrative of an average condition that the depth of water to be expected is about 75 ft. and that the distance of the rig above the water surface is about 25 ft.

In accordance with this aspect of the invention the spring-reel is to be pre-loaded sufficiently to balance the pull exerted by the cable when the instruments are part way to the bottom.

This may be done approximately by tightening the spring a predetermined number of turns corresponding to the weight and the depth at which equilibrium is desired. Or it may be done with greater accuracy by paying out the cable, say 50 feet, to place the instruments about halfway to bottom, and then tightening or loosening the tension thus placed on the spring by means of the initial tension regulating crank 54, until equilibrium is obtained. Such point may be determined in various ways, as by observing the slight oscillatory rotation of the drum under such conditions which will cause detent 65 to bear closely first to one side of notch 64 and then to the other side. When this setting has been made, it may be checked simply by unlatching detent 65 and observing that the cable 13 neither runs out nor rewinds to any substantial extent.

Under these conditions, counter-clockwise turning of the reel-crank 17 will effect additional lowering of the instruments and additional loading of the spring-means, and clockwise turning of crank 17 will augment the pull of the spring-means and effect raising of the instruments from the equilibrium position, with but a fraction of the effort which would be required with an ordinary hand-reel.

In addition, when it is desired to return to the equibrium position from a position of displacement either below or above the same, it is necessary merely to release the detent 65 and allow such return, which may be governed in rapidity by control of the crank 17.

In this way much more rapid retrieving of the instruments may be effected to avoid floating debris, with much less effort on the part of the operator.

In addition it has been found that this invention greatly facilitates detection of grounding of the instruments on the bottom.

When using an ordinary hand-reel to lower the instruments the operator has to hold back against the tendency of the reel to run out, so continuously and so strongly, because of the weight of the instruments and cable and drag of the current, that he is greatly fatigued. As the weight of the cable standing part and the drag of the current thereon continues after grounding, it is seen that the grounding merely removes a fraction of the pull from the cable. Thus while there is a fractional decrease in the holding-back effort required it is difficult for the fatigued operator, whose angle of application of effort to the hand crank continuously changes during the lowering, to appreciate at once that he is exerting a fractionally less amount of effort than before.

But with this invention, the operator in the first place is not so fatigued, and in the second place he is "pushing" the cable out, being aided by the weight of the instruments. When this aid suddenly decreases the power he has been exerting becomes insufficient to "push" out any more cable and the reel stops and cannot be further turned except by a substantial increase in the amount of effort exerted. The bottoming of the instruments is thus easily detected.

It is preferred to employ the invention in such a way that a point of equilibrium may be obtained before bottoming of the instruments, i. e., in accordance with the first aspect, above mentioned, to obtain the maximum advantage. However, the invention may be practiced in a second aspect with the power-storing means so slightly loaded, or so weak, as to be insufficient to establish an equilibrium before bottom is reached. In this case the entire operation will be of the nature of that above described for operation above the first point of equilibrium; lowering may be effected merely by permitting cable to run out; raising may be effected aided by the stored-power; and in this case bottoming of the instruments will be readily detected by the fact that the stored power will be sufficient to balance the weight of unreeled cable and drag of the current when the pull of the instruments on the cable ceases because of bottoming. Thus the operator who has been holding back the reel up to this point will no longer have to hold back upon it and will appreciate that bottom has been reached much more readily than he can with an ordinary hand-operated reel.

In other words in the preferred form of this aspect of the invention, an equilibrium becomes established at the bottom-contact stage, or the instant the sounding weight touches bottom, so that cable will run out until this critical point is reached, at which point running out of cable will immediately cease, and an accurate depth indication be thus obtained.

From the foregoing description it will be seen that the invention is not limited to the particular embodiment described.

The invention described herein may be manufactured and used by or for the Government of the United States for governmental purposes, without the payment to me of any royalty thereon.

I claim as my invention:

1. A water surveying rig comprising water surveying instruments, a cable attached to the instruments, a spring-loaded reel for said cable, said reel being of the type to store power in the spring as the cable is unreeled, said spring-loaded reel being loadable to such degree as to effect an equilibrium with the pull of the cable on the reel when the instruments are partly lowered, and being further loadable by application of power thereto in increasing amounts to complete lowering of the water surveying instruments, said rig requiring a material increase in application of power to the spring-loaded reel to effect further unreeling upon grounding of the instruments, whereby grounding of the instruments may be readily detected.

2. A water surveying rig of the type including a water surveying instrument, a cable and a hand-cranked reel, further comprising a power-storing means having a retracting strength correlated with the other aforesaid parts of the rig so that comparatively little or no force need be applied to the hand-crank to force out cable before bottoming of the instrument, while considerable addition force must be applied to the hand-crank to force out more cable after such bottoming, said power storing means aiding in raising the instrument; whereby accurate detection of bottoming of the instrument, and easy and rapid raising thereof, by an operator manipulating the hand-crank, are facilitated.

3. A water surveying rig comprising a water surveying instrument, a cable connected thereto and a power-storing spring-loaded reeling means for the cable provided with a hand-crank, said spring-loaded reeling means having means for adjusting its tension capable of adjustment so that the spring-tensioning of the reel as power is stored therein is insufficient to establish an equilibrium with the pull of the cable at the upper stages of the survey but sufficient to establish such equilibrium when the instrument is positioned at one of the lower stages including the bottom contact stage of the depth of survey to be made, the stored power of said spring loaded reeling means aiding in raising said instrument; whereby accurate detection of bottom level and easy and rapid raising of the instrument, by an operator manipulating the hand-crank, are facilitated.

ARTHUR H. FRAZIER.